(12) United States Patent
Kim et al.

(10) Patent No.: US 10,078,777 B2
(45) Date of Patent: Sep. 18, 2018

(54) FINGERPRINT RECOGNITION SENSOR AND PORTABLE DISPLAY DEVICE HAVING THE SAME

(71) Applicant: SILICON DISPLAY TECHNOLOGY, Yongin-si (KR)

(72) Inventors: Jaemin Kim, Gyeongsan-si (KR); Kijoong Kim, Suwon-si (KR); Young Man Park, Gwangju-si (KR); Ji Ho Hur, Yongin-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 72 days.

(21) Appl. No.: 15/402,388

(22) Filed: Jan. 10, 2017

(65) Prior Publication Data
US 2018/0060642 A1 Mar. 1, 2018

(30) Foreign Application Priority Data

Aug. 29, 2016 (KR) .................. 10-2016-0109999

(51) Int. Cl.
*G06K 9/00* (2006.01)
*G02B 5/04* (2006.01)

(52) U.S. Cl.
CPC ......... *G06K 9/00053* (2013.01); *G02B 5/045* (2013.01); *G06K 9/00013* (2013.01); *G06K 9/00046* (2013.01); *G06K 9/00087* (2013.01)

(58) Field of Classification Search
CPC ................ G06K 9/00013; G06K 9/00046
See application file for complete search history.

(56) References Cited

U.S. PATENT DOCUMENTS

| | | | | |
|---|---|---|---|---|
| 5,448,649 A * | 9/1995 | Chen | .................. | G06K 9/00046 356/71 |
| 5,732,148 A * | 3/1998 | Keagy | ................ | G06K 9/00046 356/71 |
| 5,796,858 A * | 8/1998 | Zhou | .................. | G06K 9/00046 235/382 |
| 6,188,781 B1 * | 2/2001 | Brownlee | .......... | G06K 9/00046 382/127 |
| 6,885,439 B2 * | 4/2005 | Fujieda | ................ | G06K 9/0004 356/71 |

(Continued)

FOREIGN PATENT DOCUMENTS

| KR | 10-2000-0010846 | 2/2000 |
|---|---|---|
| KR | 10-2005-0000455 | 1/2005 |

(Continued)

*Primary Examiner* — Utpal Shah
(74) *Attorney, Agent, or Firm* — Lex IP Meister, PLLC

(57) ABSTRACT

Disclosed are a fingerprint recognition sensor including: a light source positioned while being spaced apart on one surface of the substrate and irradiating light toward the substrate; and a light direction switching layer positioned between the substrate and the light source, having a thickness-direction cross-section having a right-angled triangular shape, and including multiple protrusions constituted by a first surface in which the light irradiated from the light source is incident and refracted, a second surface contacting the one surface of the substrate, in which the refracted light is transmitted toward the substrate, and a third surface vertical to the one surface of the substrate, and a mobile display device having the same.

17 Claims, 14 Drawing Sheets

(56) References Cited

U.S. PATENT DOCUMENTS

| | | | | |
|---|---|---|---|---|
| 6,891,962 B1* | 5/2005 | Kuno | ................. | G06K 9/00046 |
| | | | | 356/71 |
| 8,564,653 B2* | 10/2013 | Mitchell | ............ | G06K 9/00046 |
| | | | | 348/77 |
| 9,098,733 B2* | 8/2015 | Higuchi | .............. | G06K 9/00046 |
| 9,245,167 B2* | 1/2016 | Carver | ................. | G06K 9/0004 |
| 9,934,418 B2* | 4/2018 | Mienko | ................ | G06K 9/0004 |
| 2010/0183200 A1* | 7/2010 | Wu | .................... | G06K 9/00046 |
| | | | | 382/127 |
| 2014/0028629 A1* | 1/2014 | Drumm | ................ | G06F 3/0308 |
| | | | | 345/175 |

FOREIGN PATENT DOCUMENTS

| | | |
|---|---|---|
| KR | 1020130114883 | 6/2014 |
| KR | 10-2015-0115607 | 10/2015 |
| KR | 10-2016-0029698 | 3/2016 |

* cited by examiner

FINGERPRINT RECOGNITION SENSOR AND PORTABLE DISPLAY DEVICE HAVING THE SAME

CROSS-REFERENCE TO RELATED APPLICATION

This application claims priority to and the benefit of Korean Patent Application No. 10-2016-0109999 filed in the Korean Intellectual Property Office on Aug. 29, 2016, the entire contents of which are incorporated herein by reference.

BACKGROUND OF THE INVENTION

(a) Field of the Invention

A fingerprint recognition sensor and a mobile display device having the same are provided.

(b) Description of the Related Art

A fingerprint recognition technology as a technology that determines whether a user is authenticated by electronically reading a fingerprint of a finger of the user and comparing the read fingerprint and previously input data to verify an identity of the user is excellent in safety and convenience, low in manufacturing cost, and is applicable to various fields among bio recognition technologies.

Acquiring a high-quality image for the fingerprint is required for a reliable fingerprint recognition system having a high recognition rate and a low error rate and to this end, development of a fingerprint recognition sensor having more excellent performance is requested.

In recent years, a capacitive fingerprint recognition sensor and an optical fingerprint recognition sensor are widely used and the optical fingerprint recognition sensor is configured in a structure including a light source and an optical sensor and the optical sensor senses light emitted from the light source and reflected to sense the fingerprint of the user.

Korean Patent Unexamined Publication No. 2000-0010846 for the optical fingerprint recognition sensor includes a fingerprint sensing system in which illumination light is incident through an incident plane of a sheet prism to be fully reflected inside the prism and radiated through an emitting plane.

However, since a specific distance from a sensing plane to a lens and a specific distance from the lens to a detector need to be requisitely secured for fingerprint recognition by using a separate lens and a separate detector together and a transistor driving a fingerprint recognition system needs to be externally separately provided, a total thickness of the system increases and a volume cannot but increase. Further, the fingerprint recognition sensor may not be easily coupled with another device such as a display panel.

FIG. 10 is a diagram illustrating a method of fingerprint recognition when a fingerprint recognition sensor in the related art additionally includes cover glass.

Referring to FIG. 10, a general fingerprint recognition sensor 10 includes a substrate 40, a sensor pixel (SPXL) 60, an adhesive layer 78, and cover glass 80. Herein, the sensor pixel 60 may include a lens (not illustrated) and a detector (not illustrated) and may include an external separate driving transistor (not illustrated).

The sensor pixel 60 may sense a difference in amount of light which reaches the sensor pixel 60 while being reflected on a valley 92 and a ridge 94 of a user's fingerprint 90. The reason is that some light is absorbed or refracted by a fingerprint in the ridge 94 of the fingerprint 90. In the case of FIG. 10, it is expressed that the thickness of the cover glass 80 has a difference from the thickness of the sensor pixel 60 by approximately 5 times for easy description, but both thicknesses may be actually different from each other by 100 times or more. Therefore, since light $L_{10}$ is lost in the cover glass 80, when a difference between the amount of the light which is reflected on the valley 92 of the fingerprint 90 and reaches the sensor pixel 60 and the amount of the light which is reflected on the ridge 94 of the fingerprint 90 and reaches the sensor pixel 60 is not large, the fingerprint recognition may not be smoothly achieved.

When the light $L_{10}$ is irradiated in a vertical direction to the substrate 40, the light that passes through the cover glass 80 may be diffusedly reflected on the valley 92 of the fingerprint 90 of the user and the amount of the light which reaches the sensor pixel 60 may be remarkably reduced. Due to the loss of the light, the sensor pixel 60 may not almost recognize the difference between the light reflected on the ridge 94 of the fingerprint 90 of the user and the light reflected on the valley 92 in the cover glass 80 and definition of a fingerprint image may significantly deteriorate.

SUMMARY OF THE INVENTION

A fingerprint recognition sensor according to an exemplary embodiment of the present invention has been made in an effort to enhance definition of a fingerprint image.

A fingerprint recognition sensor according to an exemplary embodiment of the present invention has also been made in an effort to acquire a uniform fingerprint image.

A fingerprint recognition sensor according to an exemplary embodiment of the present invention has also been made in an effort to reduce the thickness and the volume of the fingerprint recognition sensor.

A fingerprint recognition sensor according to an exemplary embodiment of the present invention has also been made in an effort to facilitate coupling with another device.

The exemplary embodiments of the present invention may be used for achieving other objects which are not mentioned in detail in addition to the objects.

An exemplary embodiment of the present invention provides a fingerprint recognition sensor including: a light source positioned while being spaced apart on one surface of the substrate and irradiating light toward the substrate; and a light direction switching layer positioned between the substrate and the light source, having a thickness-direction cross-section having a right-angled triangular shape, and including multiple protrusions constituted by a first surface in which the light irradiated from the light source is incident and refracted, a second surface contacting the one surface of the substrate, in which the refracted light is transmitted toward the substrate, and a third surface vertical to the one surface of the substrate. Further, the fingerprint recognition sensor may include: a cover layer spaced apart from the other surface of the substrate and facing the substrate; multiple sensor pixels defined by multiple scan lines and multiple data readout lines on the outer surface of the substrate and positioned between the substrate and the cover layer; and multiple photo sensors positioned in the respective sensor pixels and sensing the light transmitted from the light direction switching layer toward the substrate and total-reflected on a surface contacting a fingerprint of a user on the cover layer. Herein, an angle formed by the first surface and the third surface of the protrusion may be 19° or lower.

As the angle formed by the first surface and the third surface of the protrusion is smaller, an incident angle of the light transmitted toward the substrate on the surface contacting the fingerprint of the user in the cover layer may increase.

The angle formed by the first surface and the third surface of the respective protrusion may be different from each other.

A thickness-direction length of the third surface in the respective protrusion may be different from each other.

A refractive index of the respective protrusion may be larger than 1.0 and equal to or less than 2.0, and the refractive index of the respective protrusion may be the same as each other.

The refractive index of the cover layer may be larger than 1.0 and equal to or less than 2.0, and the refractive index of the cover layer may be the same as the refractive index of the protrusion.

The fingerprint recognition sensor may further include: multiple thin film transistors connected to the multiple scan lines and the multiple data readout lines and transmitting a current signal depending on resistance variation of each photo sensor to the multiple data readout lines, in which each photo sensor may include a first electrode formed by extending the drain electrode of the thin film transistor, a semiconductor layer positioned on the first electrode, and a second electrode including the transparent material and positioned on the semiconductor layer, and wherein the first electrode and the second electrode may form a capacitor.

The thin film transistor may have a co-planar structure, a staggered structure, an inverted co-planar structure, or an inverted staggered structure.

A channel layer of the thin film transistor may include a low-temperature polycrystalline silicon (LTPS), an amorphous silicon (a-Si), or an oxide.

A semiconductor layer of the photo sensor may include an amorphous silicon (a-Si), an organic material, or a quantum dot.

Another exemplary embodiment of the present invention provides a fingerprint recognition sensor including: a light source positioned while being spaced apart on one surface of the substrate and irradiating light toward the substrate; a first light direction switching layer positioned between the substrate and the light source, having a thickness-direction cross-section having a right-angled triangular shape, and including multiple first protrusions constituted by a first surface in which the light irradiated from the light source is incident and refracted, a second surface parallel to the one surface of the substrate, in which the refracted light is transmitted, and a third surface vertical to the one surface of the substrate; and a second light direction switching layer positioned between the first light direction switching layer and the substrate and having a thickness-direction cross-section having a right-angled triangular shape, and including multiple second protrusions constituted by a fourth surface in which the light transmitted from the first light direction switching layer is incident and refracted, a fifth surface contacting the one surface of the substrate, in which the refracted light is transmitted toward the substrate, and a sixth surface vertical to the one surface of the substrate. Further, the fingerprint recognition sensor may include: a cover layer spaced apart from the other surface of the substrate and facing the substrate; multiple sensor pixels defined by multiple scan lines and multiple data readout lines on the other surface of the substrate and positioned between the substrate and the cover layer; and multiple photo sensors positioned in the respective sensor pixels and sensing the light transmitted from the second light direction switching layer toward the substrate and total-reflected on a surface contacting a fingerprint of a user on the cover layer.

The angle formed by the first surfaces and the third surfaces of the respective protrusion may be different from each other, and a thickness-direction length of the third surface of the respective first protrusion may be the same as each other.

The respective first protrusion and the respective second protrusion may overlap with each other in the thickness direction, and the angle formed by the first surface and the third surface of the respective first protrusion may be the same as the angle formed by the fourth surface and the sixth surface of the respective second protrusion which overlaps with the respective first protrusion.

A refractive index of the first protrusion may be different from a refractive index of the second protrusion.

The fingerprint recognition sensor may further include multiple thin film transistors connected to the multiple scan lines and the multiple data readout lines and transmitting a current signal depending on resistance variation of each photo sensor to the multiple data readout lines.

Yet another exemplary embodiment of the present invention provides a mobile display device including: a display panel displaying an image or video; a transparent protective layer positioned on the display panel; and a fingerprint recognition sensor, which is positioned at least at a partial area between the display panel and the transparent protective layer.

The fingerprint recognition sensor may be positioned at a groove positioned in a partial area of the transparent protective layer.

According to exemplary embodiments of the present invention, a fingerprint recognition sensor and a mobile display device having the same can enhance definition of a fingerprint image, acquire a uniform fingerprint image, reduce the thickness and the volume of the fingerprint recognition sensor, and facilitate coupling with another device.

DETAILED DESCRIPTION OF THE EMBODIMENTS

Figure 1A:
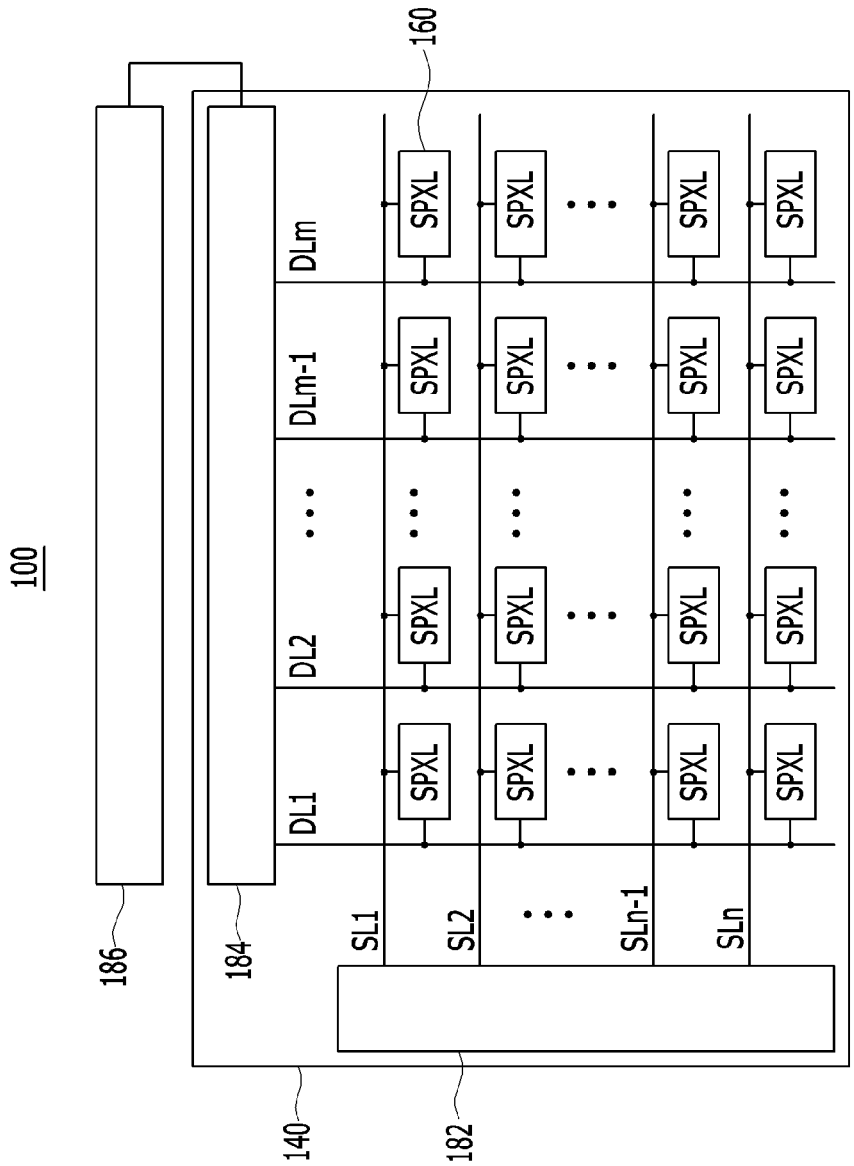
FIG. 1A is a diagram for describing an overall driving scheme of a fingerprint recognition sensor according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, a part which is not associated with description in order to clearly describe the present invention is omitted and like reference numerals designate like elements throughout the specification. In addition, the detailed description of the widely known technologies will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Meanwhile, when an element is referred to as being "directly on" another element, there are no intervening elements present. It will be understood that when an element such as a layer, film, region, or substrate is referred to as being "on" another element, it can be directly on the other element or intervening elements may also be present. Meanwhile, when an element is referred to as being "directly beneath" another element, there are no intervening elements present.

Throughout the specification, unless explicitly described to the contrary, the word "comprise" and variations such as "comprises" or "comprising", will be understood to imply the inclusion of stated elements but not the exclusion of any other elements.

Figure 1B:
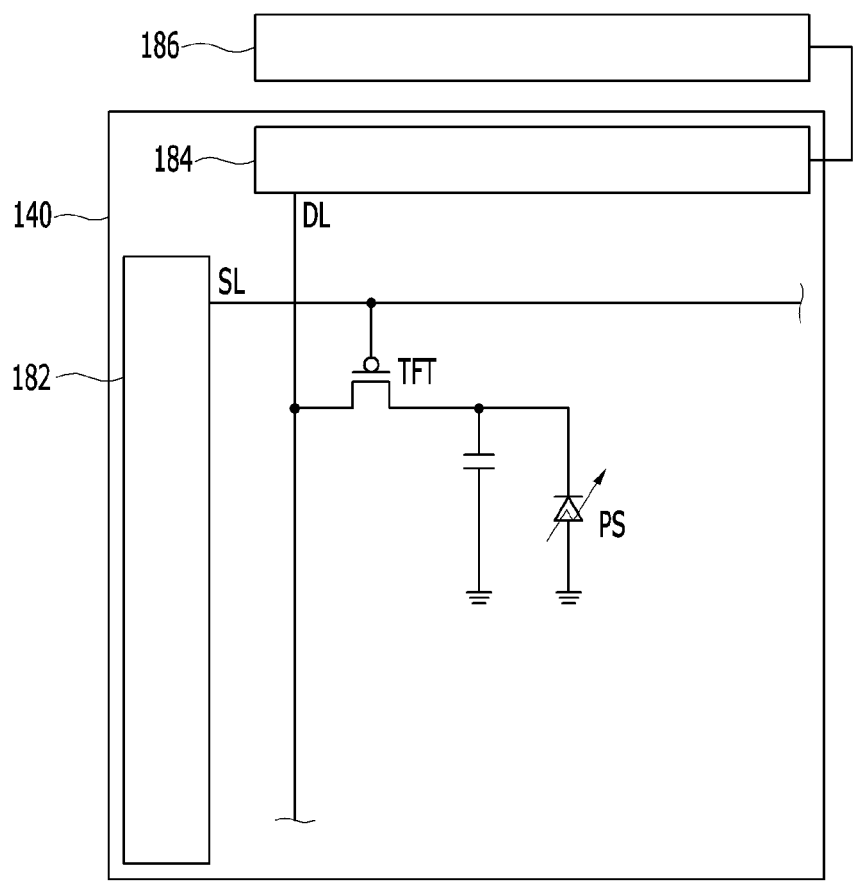
FIG. 1B is a diagram illustrating a driving scheme of one sensor pixel in the fingerprint recognition sensor of FIG. 1A.

FIG. 1A is a diagram for describing an overall driving scheme of a fingerprint recognition sensor according to an exemplary embodiment and FIG. 1B is a diagram illustrating a driving scheme of one sensor pixel in the fingerprint recognition sensor of FIG. 1A.

Referring to FIGS. 1A and 1B, the fingerprint recognition sensor 100 includes multiple scan lines SL1 to SLn and multiple data readout lines DL1 to DLm positioned on a substrate 140. Herein, the multiple scan lines SL1 to SLn are disposed to be spaced apart from each other in parallel and the multiple data readout lines DL1 to DLm are also disposed to be spaced apart from each other in parallel. The multiple scan lines SL1 to SLn and the multiple data readout lines DL1 to DLm cross each other and a sensor pixel (SPXL) 160 is defined in every cross area.

The sensor pixel 160 includes a thin film transistor TFT electrically connected to the multiple scan lines SL1 to SLn and the multiple data readout lines DL1 to DLm to switch each sensor pixel 160 and a photo sensor PS connected with a drain electrode of the thin film transistor TFT.

A gate electrode of the thin film transistor TFT is connected with the scan line (SL), a source electrode is connected with the data readout line DL, and the drain electrode is connected with the photo sensor PS. Herein, two electrodes included in the photo sensor PS may form a capacitor.

The fingerprint recognition sensor 100 may include a scan line driver 182 driving the multiple scan lines SL1 to SLn and a readout controller 184 and a readout driver 186 driving the multiple data readout lines DL1 to DLm.

The scan line driver 182 supplies a gate signal to the scan line SL. The scan line driver 182 may select the scan line SL of the sensor pixel 160 detecting a fingerprint image and the thin film transistor TFT may be turned on. Although not illustrated, the scan line driver 182 may include a shift register generating the gate signal to sequentially supply the gate signal to the thin film transistor TFT and a level shifter level-shifting the gate signal supplied to the sensor pixel 160 into high voltage required for switching.

The readout controller 184 and the readout driver 186 detect a current signal generated by the sensor pixel 160 selected by the gate signal. Although not illustrated, the readout controller 184 may include a multiplexer selecting one of the multiple data readout lines DL1 to DLm and outputting the selected data readout line to the readout driver 186, the shift register generating a switching signal of the multiplexer, and the level shifter boosting output voltage from the shift register.

When light reflected on a fingerprint reaches the photo sensor PS and the current signal depending on resistance variation is thus generated, electric charges are stored in the capacitor and when the thin film transistor TFT is turned on, the stored electric charges may be transmitted to the data readout line DL through the thin film transistor TFT and transmitted to the readout driver 186 by the readout controller 184.

Figure 2:
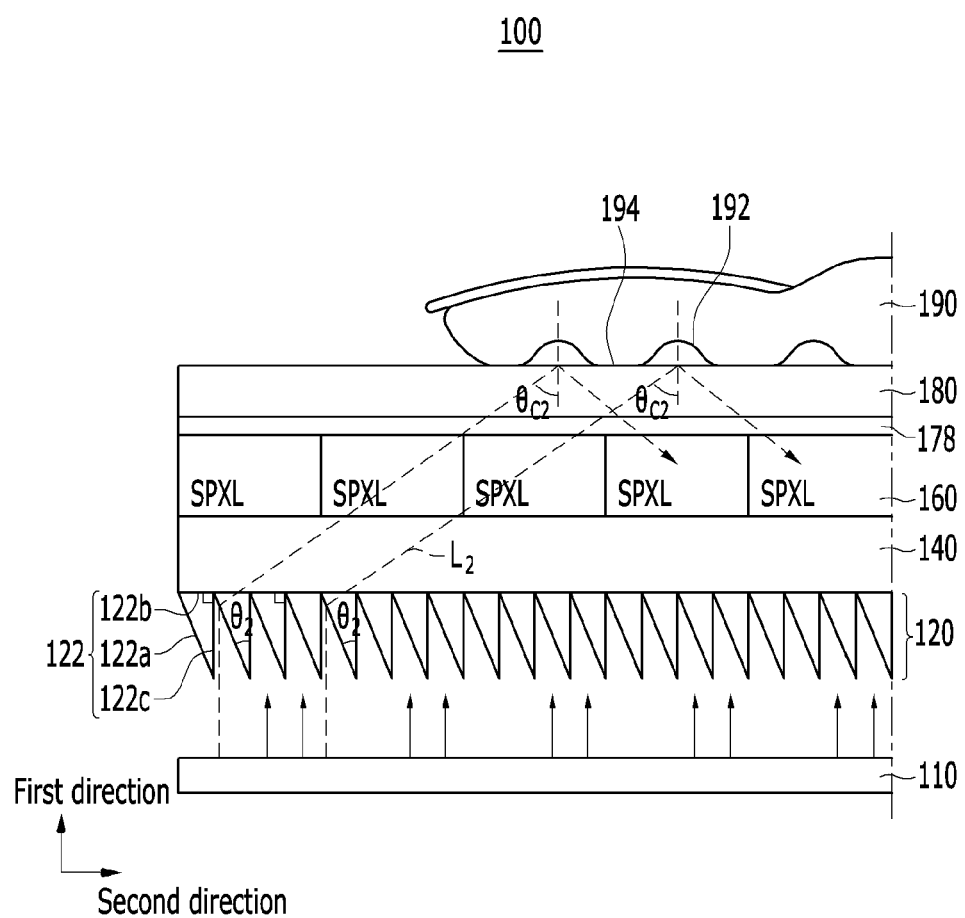
FIG. 2 is a diagram schematically illustrating a cross-section of the fingerprint recognition sensor according to an exemplary embodiment.
Figure 3:
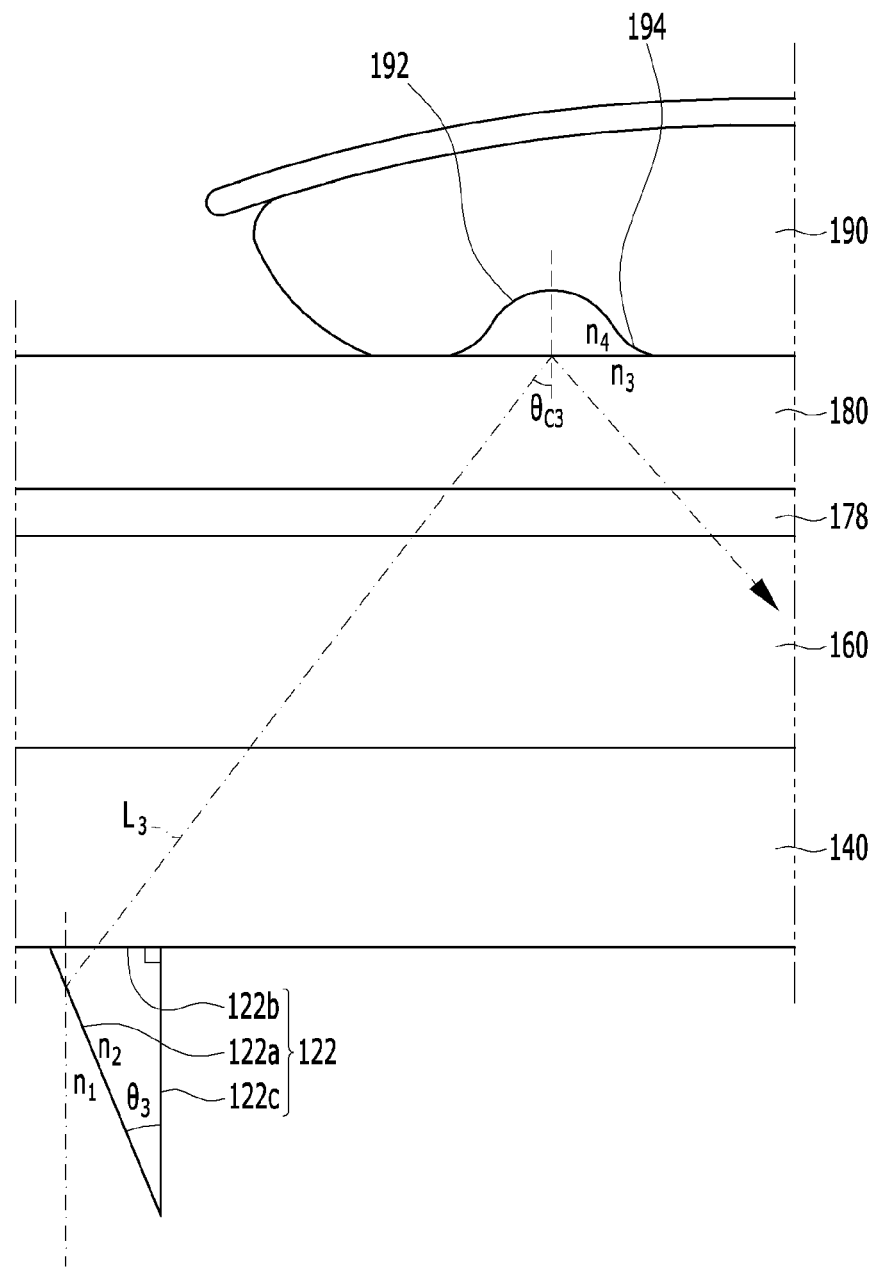
FIG. 3 is a diagram schematically illustrating the enlarged cross-section of the fingerprint recognition sensor according to the exemplary embodiment.

FIG. 2 is a diagram schematically illustrating a cross-section of the fingerprint recognition sensor according to an exemplary embodiment and FIG. 3 is a diagram schematically illustrating the enlarged cross-section of the fingerprint recognition sensor according to the exemplary embodiment.

Referring to FIGS. 1A to 2, the fingerprint recognition sensor 100 includes a light source 110 positioned while being spaced apart on one surface of the substrate 140 and irradiating light toward the substrate 140 and a light direction switching layer 120 positioned between the substrate 140 and the light source 110 and having a thickness-direction cross-section having a right-angled triangular shape, and including multiple protrusions 122 constituted by a first surface 122a in which light $L_2$ irradiated from the light source 110 is incident and refracted, a second surface 122b in which light $L_2$ contacting and refracted on one surface of the substrate 140 is transmitted toward the substrate 140, and a third surface 122c vertical to one surface of the substrate. Further, the fingerprint recognition sensor 100 includes a cover layer 180 spaced apart from the other surface of the substrate 140 and facing the substrate 140, multiple sensor pixels 160 defined by multiple scan lines SL1 to SLn and multiple data readout lines DL1 to DLm on the other surface of the substrate 140 and positioned between the substrate 140 and the cover layer 180, and multiple photo sensors PS positioned in the respective sensor pixels 160 and sensing light $L_2$ transmitted on the light direction switching layer 120 toward the substrate 140 and total-reflected on a surface contacting a fingerprint of a user on the cover layer 180.

A thickness direction means a direction parallel to a first direction of FIG. 2 and a critical angle means a reference angle at which the light reaching the cover layer 180 may be total-reflected on the surface contacting the fingerprint 190 on the cover layer 180.

The user contacts a finger on one surface (an upper surface in the drawing) of the cover layer 180 of the fingerprint recognition sensor 100 to make the fingerprint 190 be recognized. The light $L_2$ is total-reflected at a portion corresponding to a valley 192 of the fingerprint 190 on one surface of the cover layer 180, while the light $L_2$ is absorbed in or refracted on the fingerprint 190 at a portion corresponding to a ridge 194 of the fingerprint 190 on one surface of the cover layer 180 and only some light may be reflected. Therefore, the photo sensor PS may sense a difference between the amount of the light which reaches the photo sensor PS while being total-reflected on the portion corresponding to the valley 192 of the fingerprint 190 on one surface of the cover layer 180 contacting the fingerprint 190 and the amount of the light which reaches the photo sensor PS while being reflected on the portion corresponding to the ridge 194 of the fingerprint 190 and as the difference is larger, a clearer fingerprint image may be acquired.

The substrate 140 includes the transparent material and may include, for example, the glass or plastic material, but the present invention is not limited thereto.

The light source 110 is positioned to be spaced apart on one surface of the substrate 140 and may be, for example, a display panel such as an LED, a liquid crystal display panel, an organic light emitting display panel, but is not limited thereto.

The light direction switching layer 120 has the thickness-direction cross section having the right-angled triangular shape and includes the first surface 122a, the second surface 122b, and the third surface 122c. The light direction switching layer 120 may switch a direction of the light $L_2$ irradiated from the light source 110 so that the light $L_2$ irradiated from the light source 110 is total-reflected on the surface contacting the fingerprint 190 on the cover layer 180. Further, an angle $\theta_{C2}$ formed by the light $L_2$ of which the direction is switched on the light direction switching layer 120 and one surface of the cover layer 180 is larger than the critical angle.

While the light $L_2$ may be refracted while being incident on the first surface 122a of the light direction switching layer 120 and the refracted light may be total-reflected while being progressed to the cover layer 180 through the second surface 122b. The light $L_2$ is refracted on the first surface 122a because a refractive index of the protrusion 122 and the refractive index of an external material (air) are different from each other.

Herein, an angle $\theta_2$ formed by the first surface 122a and the third surface 122c of the protrusion 122 may be 19° or lower. Within such an angular range, the irradiated light $L_2$ is refracted to be total-reflected on the top of the cover layer 180.

The refractive index of the cover layer 180 may be larger than that of the external material (air, etc.,) of the cover layer 180. For example, the refractive index of the cover layer 180 may be larger than approximately 1.0 and equal to or smaller than approximately 2.0. When the refractive index of the cover layer 180 is within such a range, the critical angle may be equal to or more than 30° and less than 90°.

For example, when the external medium of the cover layer 180 is the air (the refractive index is approximately 1.0) and the cover layer 180 is made of the glass material having the refractive index of approximately 1.5, the critical angle may be approximately 42° and light having an angle larger than 42° may be total-reflected on the cover layer 180.

In addition, for example, when the external medium of the cover layer 180 is the air and the cover layer 180 includes high-density special glass having a refractive index of approximately 1.9, the critical angle may be approximately 32° and light having an angle larger than 32° may be total-reflected on the cover layer 180.

The cover layer 180 includes the transparent material and may include a material such as glass or plastic.

The refractive indexes of components between the light source 110 and the cover layer 180 may have the same or similar refractive index as the cover layer 180. For example, the refractive indexes of the respective protrusions 122 may be the same as each other and the refractive index of the protrusion 122 may be the same as that of the cover layer 180. Therefore, the light $L_2$ irradiated from the light source 110 and refracted on the light direction switching layer 120 may not be refracted but be progressed up to the top (an upper surface in the drawing) of the cover layer 180.

Referring to FIG. 3, when a mechanism of the fingerprint recognition is described in more detail, light $L_3$ irradiated toward the protrusion 122 is incident and refracted on the first surface 122a of the protrusion 122 to pass through the second surface 122b. Herein, the refractive index $n_2$ of the protrusion 122 may be larger than the refractive index $n_1$ of an external medium thereof. An angle at which the light $L_3$ is refracted is determined by the Snell's law and since Snell's law is a known theory, and as a result, a detailed description will be omitted.

For example, when the refractive index $n_2$ of the protrusion 122 and the refractive index $n_3$ of the cover layer 180 are 1.5 and the external medium is the air, and the refractive indexes $n_1$ and $n_4$ of the external media are approximately 1.0, the critical angle may be approximately 42°. In this case, for example, when an angle formed by the first surface 122a and the third surface 122c is approximately 5°, an incident angle $\theta_{C3}$ of the light $L_3$ reaching the cover layer 180 on the surface contacting the fingerprint on the cover layer 180 may be approximately 44° and since the incident angle $\theta_{C3}$ is larger than the critical angle, the light $L_3$ may be total-reflected.

Further, for example, when the refractive index $n_2$ of the protrusion 122 and the refractive index $n_3$ of the cover layer 180 are 1.9 and the external medium is the air, and the refractive indexes $n_1$ and $n_4$ of the external media are approximately 1.0, the critical angle may be approximately 32°. In this case, for example, when the angle formed by the first surface 122a and the third surface 122c is approximately 15°, the incident angle $\theta_{C3}$ of the light $L_3$ reaching the cover layer 180 on the surface contacting the fingerprint on the cover layer 180 may be approximately 35° and since the incident angle $\theta_{C3}$ is larger than the critical angle, the light $L_3$ may be total-reflected.

As the angle formed by the first surface 122a and the third surface 122c in the protrusion 122 is smaller, the incident angle $\theta_{C3}$ of the light $L_3$ transmitted toward the substrate 140 on the surface contacting the fingerprint 190 of the user in the cover layer 180 may be larger.

Therefore, when the light $L_3$ reaches the portion corresponding to the valley 192 of the fingerprint 190 on the top of the cover layer 180, the light $L_3$ is total-reflected and when the light $L_3$ reaches the portion corresponding to the ridge 194 of the fingerprint 190, some light may be reflected, some light may be absorbed in the fingerprint 190, and some light may be refracted. Accordingly, the photo sensor PS may sense the light $L_3$ and the fingerprint image includes brightness. The total-reflected light is expressed to be bright in the fingerprint image and light which is not total-reflected is expressed to be dark in the fingerprint image.

Figure 10:
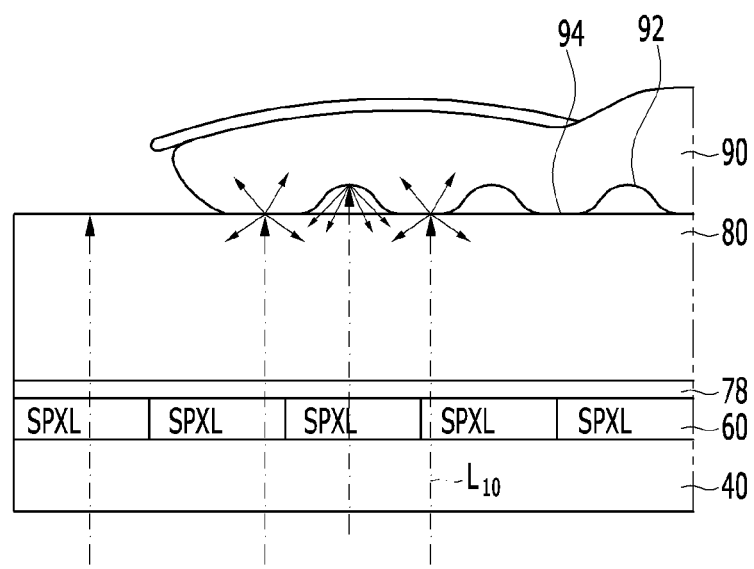
FIG. 10 is a diagram illustrating a method of fingerprint recognition when a fingerprint recognition sensor in the related art additionally includes cover glass.

When light $L_{10}$ is irradiated in a vertical direction to the substrate 40 according to the general fingerprint recognition sensor 10, the light that passes through the cover glass 80 may be diffusedly reflected on the valley 92 of the fingerprint 90 of the user and the amount of the light which reaches the sensor pixel 60 may be remarkably reduced (see FIG. 10). Due to the loss of the light, the difference between the amount of the light reflected on the ridge 94 of the fingerprint 90 of the user and the amount of the light reflected on the valley 92 in the cover glass 80 may be remarkably reduced and the definition of the fingerprint image may significantly deteriorate.

On the contrary, in the case of the fingerprint recognition sensor 100 according to the exemplary embodiment, the light $L_2$ and $L_3$ is slantly incident on the cover layer 180 to be total-reflected on the portion corresponding to the valley 192 of the fingerprint 190 on the top of the cover layer 180. Accordingly, since the light loss is significantly reduced and a relatively large amount of light thus reaches the photo sensor PS, the definition of the fingerprint image may be enhanced. Further, even though the cover layer 180 is relatively thicker than the sensor pixel 160, the clear fingerprint image may be generated.

Hereinafter, a description of components which are the same as the components described in detail in FIGS. 1A to 3 may be omitted.

Figure 4:
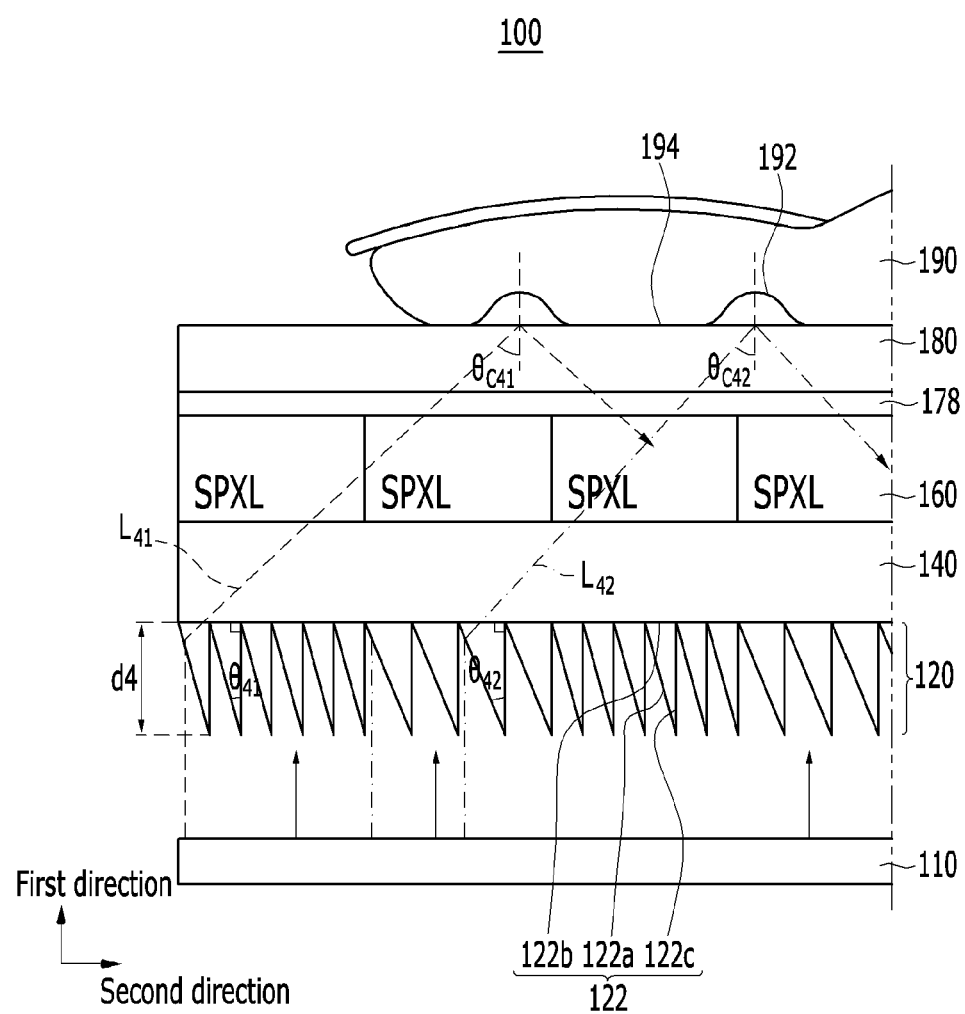
FIG. 4 is a diagram schematically illustrating the cross-section of the fingerprint recognition sensor according to the exemplary embodiment.

FIG. 4 is a diagram schematically illustrating the cross-section of the fingerprint recognition sensor according to the exemplary embodiment.

Referring to FIG. 4, $\theta_{41}$ and $\theta_{42}$ formed by the first surface 122a and the third surface 122c in the respective protrusions 122 of the light direction switching layer 120 may be the same as each other or different from each other.

When the angles $\theta_{41}$ and $\theta_{42}$ formed by the first surface 122a and the third surface 122c are the same as each other, light $L_{41}$ and $L_{42}$ is refracted at the same degree to be progressed toward the cover layer 180.

On the contrary, when the angles $\theta_{41}$ and $\theta_{42}$ formed by the first surface 122a and the third surface 122c are different from each other, the light $L_{41}$ and $L_{42}$ is refracted differently from each other to be progressed toward the cover layer 180. For example, when a forty second angle $\theta_{42}$ is larger than a forty first angle $\theta_{41}$, an incident angle $\theta_{C41}$ of forty first light $L_{41}$ on the top of the cover layer 180 may be larger than an incident angle $\theta_{C42}$ of forty second light $L_{42}$ on the top of the cover layer 180.

Therefore, in an environment in which incident directions of the irradiated light $L_{41}$ and $L_{42}$ are partially different from each other or the strengths of the irradiated light $L_{41}$ and $L_{42}$ are partially different from each other, the uniform fingerprint image may be acquired through applying the fingerprint recognition sensor 100 according to FIG. 4.

The fingerprint recognition sensor 100 of FIG. 4 is just an example for easy description and the fingerprint recognition sensor 100 according to the exemplary embodiments is not limited thereto.

Figure 5:
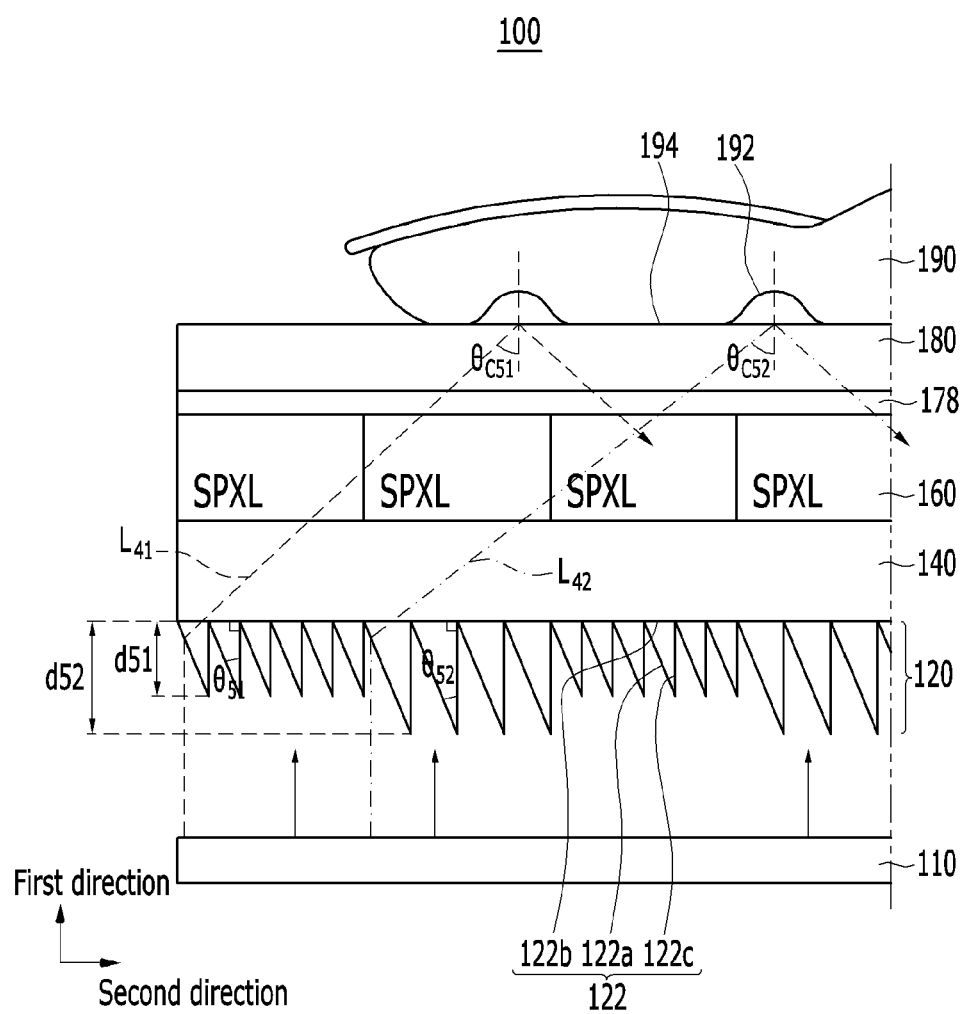
FIG. 5 is a diagram schematically illustrating the cross-section of the fingerprint recognition sensor according to the exemplary embodiment.

FIG. 5 is a diagram schematically illustrating the cross-section of the fingerprint recognition sensor according to the exemplary embodiment.

Referring to FIG. 5, thickness-direction lengths $d_{51}$ and $d_{52}$ of the third surface of in the respective protrusions 122 of the light direction switching layer 120 may be the same as each other or different from each other. Further, angles $\theta_{51}$ and $\theta_{52}$ formed by the first surface 122a and the third surface 122c in the respective protrusions 122 may be the same as each other or different from each other.

For example, the thickness-direction lengths $d_{51}$ and $d_{52}$ of the third surface of in the respective protrusions 122 may be regularly lengthened or regularly shortened or may have an irregular length toward the second direction. Simultaneously therewith, the angles $\theta_{51}$ and $\theta_{52}$ formed by the first surface 122a and the third surface 122c in the respective protrusions 122 may be regularly larger or regularly smaller or may have the irregular angle.

As a result, light $L_{51}$ and $L_{52}$ is differently refracted to be progressed toward the cover layer 180 and incident angles $\theta_{C51}$ and $\theta_{C52}$ on the top of the cover layer 180 may be different from each other. Accordingly, under a non-uniform light irradiation condition, a fingerprint image having enhanced uniformity may be acquired through a design of the protrusion 122. For example, the length of the third surface 122c of the protrusion 122 corresponding to a portion having a relatively smaller light irradiation amount is relatively long to increase an area in which the light may be incident.

Figure 6:
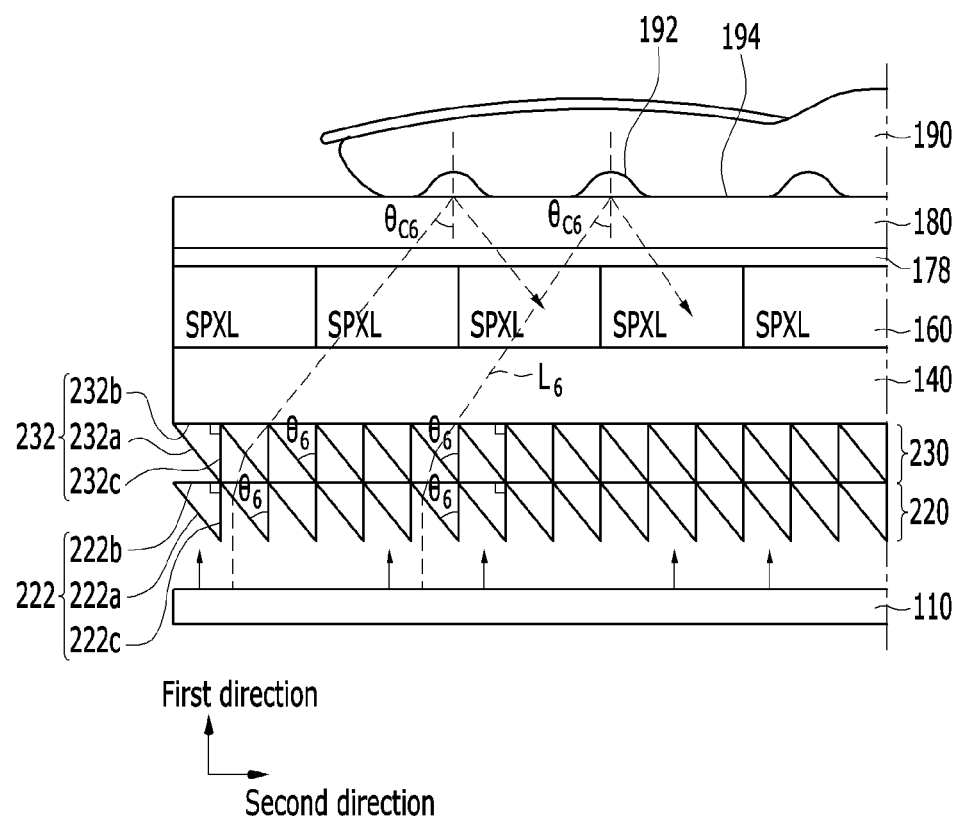
FIG. 6 is a diagram schematically illustrating the cross-section of the fingerprint recognition sensor according to the exemplary embodiment.
Figure 7:
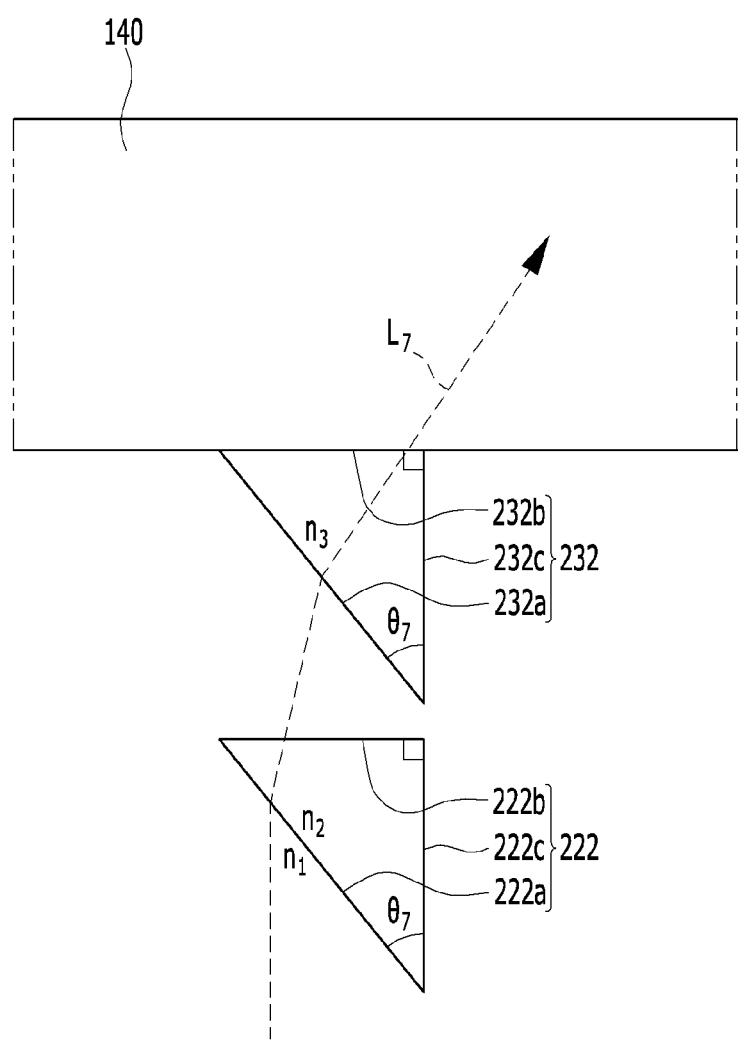
FIG. 7 is a diagram schematically illustrating the enlarged cross-section of the fingerprint recognition sensor according to the exemplary embodiment.

FIG. 6 is a diagram schematically illustrating the cross-section of the fingerprint recognition sensor according to the exemplary embodiment and FIG. 7 is a diagram schematically illustrating the enlarged cross-section of the fingerprint recognition sensor according to the exemplary embodiment.

Referring to FIG. 6, the fingerprint recognition sensor 100 includes a light source 110 positioned while being spaced apart on one surface of the substrate 140 and irradiating light toward the substrate 140 and a first light direction switching layer 220 positioned between the substrate 140 and the light source 110 and having a thickness-direction (first direction) cross-section having a right-angled triangular shape, and including multiple protrusions 222 constituted by a first surface 222a in which light $L_6$ irradiated from the light source 110 is incident and refracted, a second surface 222b parallel to one surface of the substrate 140, in which the refracted light $L_6$ is transmitted toward the substrate 140, and a third surface 222c vertical to one surface of the substrate 140. Further, the fingerprint recognition sensor 100 includes a second light direction switching layer 230 positioned between the first light direction switching layer 220 and the substrate 140 having the thickness-direction cross-section having the right-angled triangular shape, and including multiple second protrusions 232 constituted by a fourth surface 232a in which the light $L_6$ transmitting the first light direction switching layer 220 is incident and refracted, a fifth surface 232b contacting one surface of the substrate 140, in which the light is refracted and transmitted toward the substrate 140, and a sixth surface 232c vertical to one surface of the substrate 140, and the cover layer 180 positioned to be spaced apart on the other surface of the substrate 140 and facing the substrate. Further, the fingerprint recognition sensor 100 includes multiple sensor pixels 160 defined by multiple scan lines SL1 to SLn and multiple data readout lines DL1 to DLm on the other surface of the substrate 140 and positioned between the substrate 140 and the cover layer 180, and multiple photo sensors PS positioned in the respective sensor pixels 160 and sensing the light $L_6$ transmitted on the light direction switching layer 230 toward the substrate 140 and total-reflected on a surface contacting the fingerprint of the user on the cover layer 180.

The fingerprint recognition sensor 100 includes the first light direction switching layer 220 and the second light direction switching layer 230 which are sequentially stacked. The first light direction switching layer 220 has the thickness-direction cross section having the right-angled triangular shape and includes multiple first protrusions 222 including the first surface 222a, the second surface 222b, and the third surface 222c. Further, the second light direction switching layer 230 has the thickness-direction cross section having the right-angled triangular shape and includes multiple second protrusions 232 including the fourth surface 232a, the fifth surface 232b, and the sixth surface 232c.

An angle $\theta_6$ formed by the first surface 222a and the third surface 222c in each first protrusion 222 and an angle $\theta_6$ formed by the fourth surface 232a and the sixth surface 232c of the second protrusion 232 are not limited to 19° or lower unlike the exemplary embodiments described in FIGS. 2 to 5. Since the light may be refracted two times due to existence of two light direction switching layers 220 and 230, each angle $\theta_6$ may be designed to be larger.

The light direction switching layer 220 and the second light direction switching layer 230 may switch the direction of the light $L_6$ irradiated from the light source 110 so that the light $L_6$ irradiated from the light source 110 is total-reflected on the surface contacting the fingerprint 190 on the cover layer 180. Further, an incident angle $\theta_{C6}$ of the light $L_6$ of which the direction is switched by the first light direction switching layer 220 and the second light direction switching layer 23 on the top of the cover layer 180 is larger than a critical angle.

When the mechanism of the fingerprint recognition is described in more detail with reference to FIG. 7, light $L_7$ is refracted while the light $L_7$ is incident on the first surface 222a of the first protrusion 222 in the first light direction switching layer 220 and the refracted light $L_7$ passes through the second surface 222b. The light $L_7$ is refracted on the first surface 222a because the refractive index $n_2$ of the first protrusion 222 and the refractive index $n_1$ of the external material (air) are different from each other. The light $L_7$ passing through the second surface 222b of the first protrusion 222 is refracted again while the light $L_7$ is incident on the fourth surface 232a of the second protrusion 232 in the second light direction switching layer 230. The refracted light $L_7$ is progressed toward the cover layer 180 by passing through the fifth surface 232b. An incident angle of the progressed light $L_7$ on the top (the contact surface with the fingerprint) of the cover layer 180 may be larger than a critical angle.

Herein, the refractive index $n_2$ of the first protrusion 222 and the refractive index $n_3$ of the second protrusion 232 may be the same as each other or different from each other. For example, the refractive index $n_2$ of the first protrusion 222 and the refractive index $n_3$ of the second protrusion 232 are designed to be different from each other to adjust the incident angle of the light $L_7$ on the top of the cover layer 180. The refractive index $n_2$ of the first protrusion 222 may be larger than the refractive index $n_3$ of the second protrusion 232 and refractive index $n_2$ of the first protrusion 222 may be smaller than the refractive index $n_3$ of the second protrusion 232.

Figure 8:
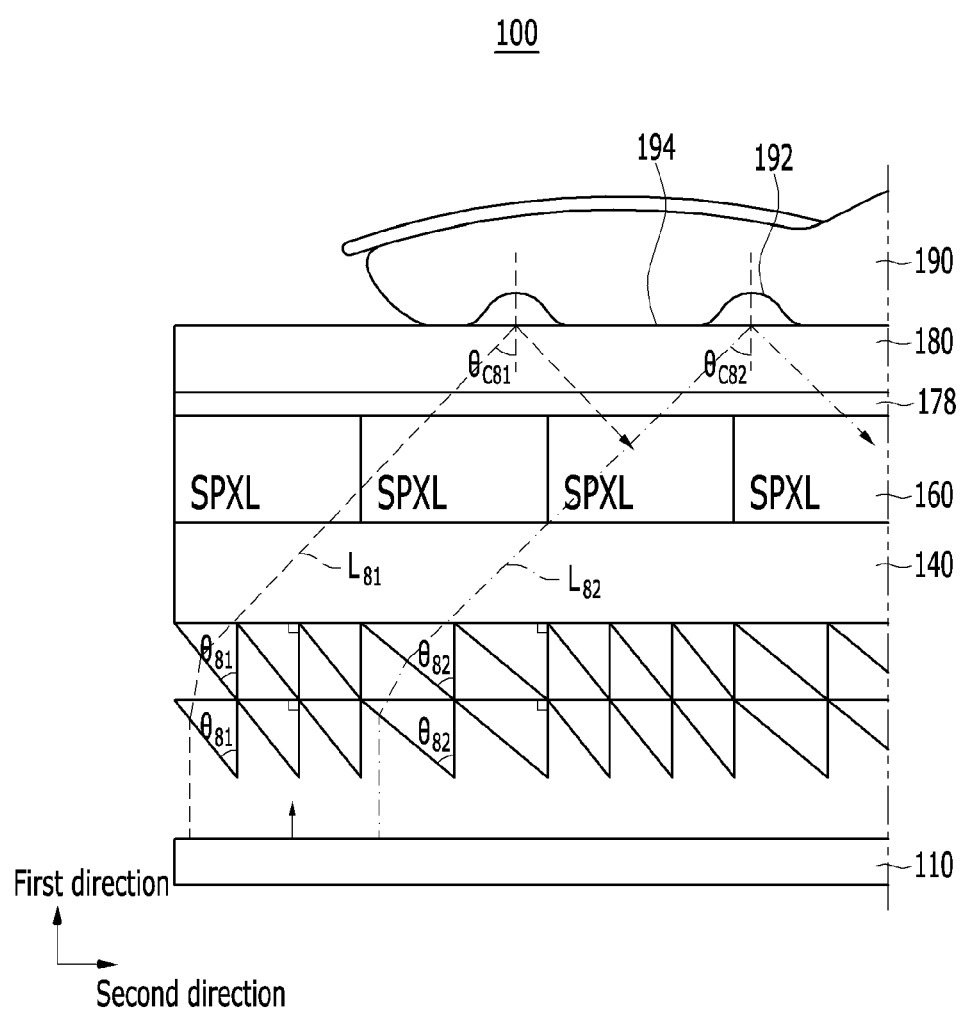
FIG. 8 is a diagram schematically illustrating the cross-section of the fingerprint recognition sensor according to the exemplary embodiment.

FIG. 8 is a diagram schematically illustrating the cross-section of the fingerprint recognition sensor according to the exemplary embodiment.

Further, angles $\theta_{81}$ and $\theta_{82}$ formed by the first surface 222a and the third surface 222c in the respective first protrusions 222 may be the same as each other or different from each other.

For example, when the angles $\theta_{81}$ and $\theta_{82}$ formed by the first surface 222a and the third surface 222c in the respective first protrusions 222 are designed to be different from each other, the uniform fingerprint image may be acquired even in an environment in which incidence directions of irradiated light $L_{81}$ and $L_{82}$ are different from each other or the strengths of the irradiated light $L_{81}$ and $L_{82}$ are different from each other.

Further, the thickness-direction lengths of the third surfaces 222c in the respective first protrusions 222 may be the same as each other.

Multiple first protrusions 222 and multiple second protrusions 232 may exist with the same number and may overlap with each other in the thickness direction (the first direction in the drawing). Further, the angles $\theta_{81}$ and $\theta_{82}$ formed by the first surface 222a and the third surface 222c in the respective first protrusions 222 may be the same as the angles $\theta_{81}$ and $\theta_{82}$ formed by a fourth surface 232a and a sixth surface 232c in the respective second protrusions 232 which overlap with the respective first protrusions 222. In addition, the thickness-direction cross-sectional shape of the first protrusion 222 may be the same as the thickness-direction cross-sectional shape of the second protrusion 232 which overlaps with (corresponds to) the first protrusion 222. Further, when the angles $\theta_{81}$ and $\theta_{82}$ formed by the first surface 222a and the third surface 222c in the respective first protrusions 222 are different from each other, the fourth surface 232a and the sixth surface 232c in the respective second protrusions 232 which overlap with the respective first protrusions 222 in the thickness direction may have the same angles $\theta_{81}$ and $\theta_{82}$ to correspond to the different angles.

As a result, the light $L_{81}$ and $L_{82}$ is differently refracted to be progressed toward the cover layer 180. For example, when an eighty second angle $\theta_{82}$ is larger than an eighty first angle $\theta_{81}$, an incident angle $\theta_{C81}$ of eighty first light $L_{81}$ on the top of the cover layer 180 may be larger than an incident angle $\theta_{C82}$ of eighty second light $L_{82}$ on the top of the cover layer 180.

Therefore, in an environment in which the incident directions of the irradiated light $L_{81}$ and $L_{82}$ are partially different from each other or the amounts of the irradiated light $L_{81}$ and $L_{82}$ are partially different from each other, the uniform fingerprint image may be acquired through applying the fingerprint recognition sensor 100 according to FIG. 8.

Meanwhile, the fingerprint recognition sensor 100 according to the exemplary embodiment includes a backlight unit including a light source 110 positioned while being spaced apart on one surface of the substrate 140 and irradiating light toward the substrate 140 and a light direction switching member 220 positioned between the substrate 140 and the light source 110 and having a thickness-direction cross-section having a right-angled triangular shape, and including multiple first protrusions 222 constituted by a first surface 222a in which the light irradiated from the light source 110 is incident and refracted, a second surface 222b parallel to one surface of the substrate 140, in which the refracted light is transmitted, and a third surface 222c vertical to one surface of the substrate 140, and a light direction switching layer 230 positioned between the backlight unit and the substrate 140. The light direction switching layer 230 has the thickness-direction cross-section with the right-angled shape and includes multiple second protrusions constituted by a fourth surface 232a in which the light transmitting the light direction switching member 220 is incident and refracted, a fifth surface 232b contacting one surface of the substrate 140, in which the light is refracted and transmitted toward the substrate 140, and a sixth surface 232c vertical to one surface of the substrate.

Herein, the backlight unit may serve to refract the light irradiated from the light source 110 and transfer the refracted light to the light direction switching layer 230. The incident angle of the light refracted by the light direction switching layer 230 again on the surface contacting the fingerprint in the cover layer 180 may be larger than the critical angle, and as a result, the light may be total-reflected and a clearer fingerprint image may be acquired.

Figure 9A:
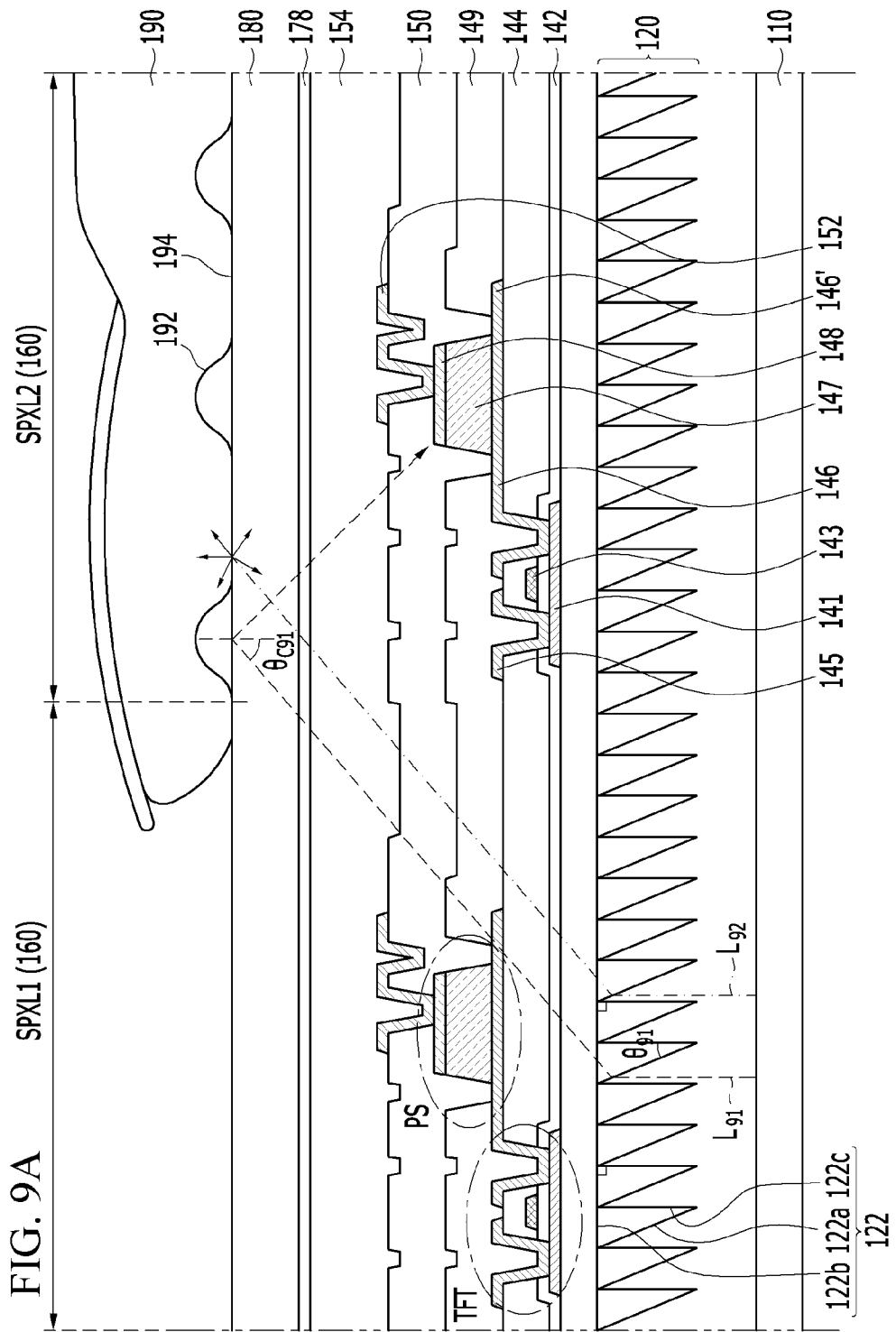
FIG. 9 is a diagram specifically illustrating the cross-section of the fingerprint recognition sensor according to the exemplary embodiment.
Figure 9B:
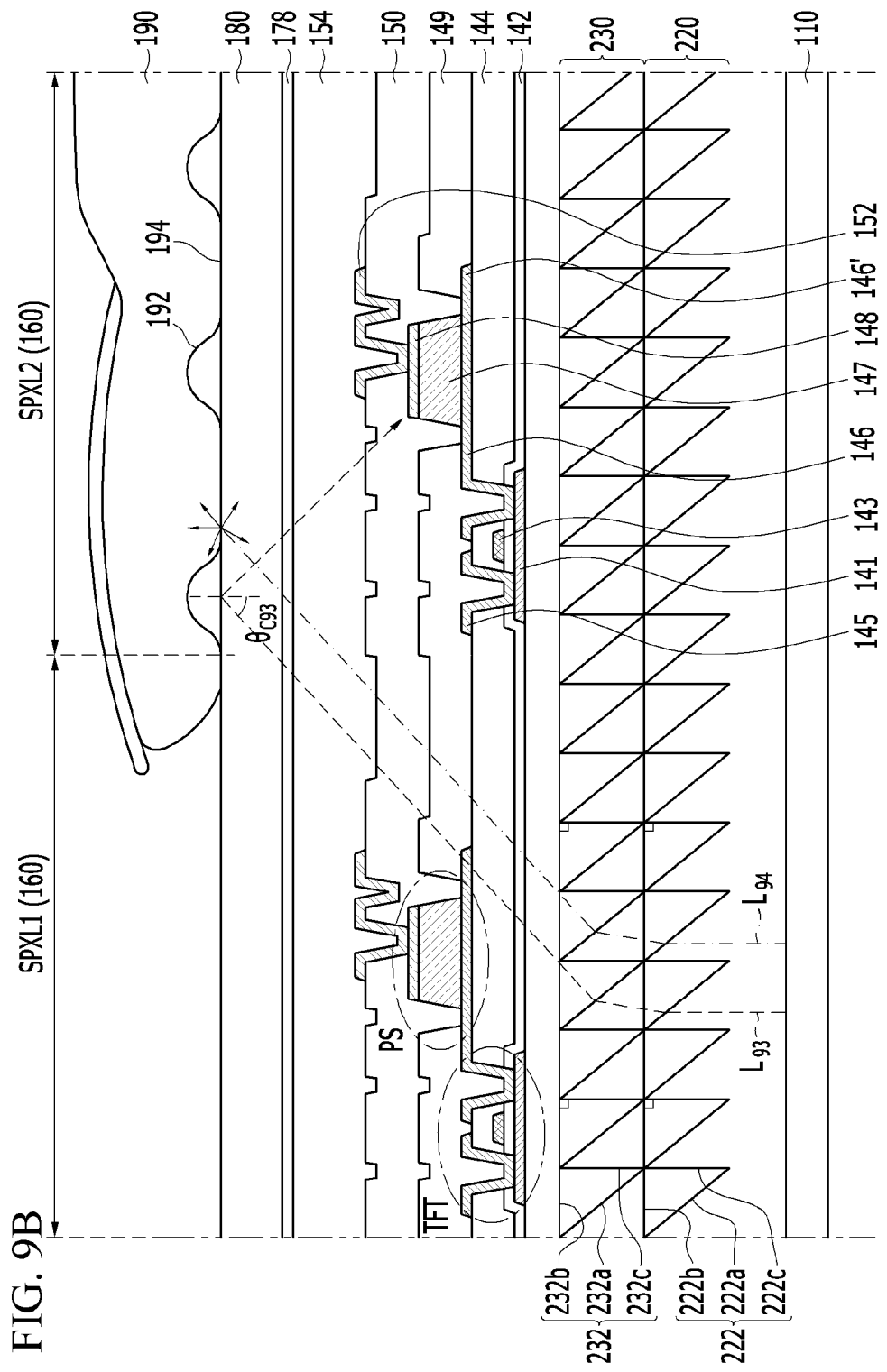

FIG. 9A is a diagram schematically illustrating the cross-section of the fingerprint recognition sensor according to the exemplary embodiment and FIG. 9B is a diagram specifically illustrating the cross-section of the fingerprint recognition sensor according to the exemplary embodiment. FIGS. 9A and 9B illustrate cross-sections corresponding to areas corresponding to two sensor pixels (SPXL1 and SPXL2) 160. Further, incident angles $\theta_{91}$ and $\theta_{93}$ of light $L_{91}$ $L_{92}$, $L_{93}$, and $L_{94}$ illustrated in FIGS. 9A and 9B on the top of the cover layer 180 may be larger than the critical angle for the total reflection.

Referring to FIG. 9A, the fingerprint recognition sensor 100 includes the substrate 140, the light source 110 positioned on one surface of the substrate 140, the light direction switching layer 120 positioned between the substrate 140 and the light source 110, and the cover layer 180 opposite to and spaced apart from the other surface of the substrate 140.

On the other surface of the substrate 140, the sensor pixels 160 are defined at the areas where the multiple scan lines SL1 to SLn and the multiple readout lines DL1 to DLm cross each other. Each sensor pixel 160 includes the photo sensor PS and the thin film transistor TFT.

The thin film transistor TFT may include a channel layer 141, a gate electrode 143, a source electrode 145, and a drain electrode 146.

A gate insulating layer 142 is positioned between the channel layer 141 and the gate electrode 143 and a first insulating layer 144 is positioned on the gate electrode 143. The source electrode 145 and the drain electrode 146 are positioned on the first insulating layer 144 and each of the source electrode 145 and the drain electrode 146 contacts the channel layer 141 through a contact hole.

However, the thin film transistor TFT illustrated in FIGS. 9A and 9B is exemplified for easy description and is not limited thereto and may be designed in various structures. The channel layer 141 may include low-temperature polycrystalline silicon (LTPS), amorphous silicon (a-Si), or oxide.

The thin film transistor TFT may have, for example, one structure of a co-planar structure, a staggered structure, an inverted co-planar structure, and an inverted staggered structure.

The photo sensor PS includes a first electrode 146' formed by extending the drain electrode 146 of the thin film transistor TFT, a semiconductor layer 147 positioned on the first electrode 146', and a second electrode 148 including the transparent material and positioned on the semiconductor layer 147. A second insulating layer 150 is positioned on the photo sensor PS and a bias electrode 152 is connected with the second electrode 148 through the contact hole. Herein, the first electrode 146' and the second electrode 148 may form the capacitor.

Herein, the semiconductor layer 147 of the photo sensor PS may include, for example, the amorphous silicon (a-Si), an organic material, or a quantum dot.

A planarization layer 154 may be positioned on the second insulating layer 150 and the bias electrode 152. The planarization layer 154 may protect the thin film transistor TFT and the photo sensor PS therebelow and planarize elements.

An optical adhesive layer 178 may be positioned between the cover layer 180 and the planarization layer 154. The optical adhesive layer 178 may have the same refractive index as the cover layer 180 and include the transparent material.

The photo sensor PS may sense the light $L_{91}$ total-reflected on the surface corresponding to the valley 192 of the fingerprint 190 in the cover layer 180 and sense the light $L_{92}$ partially reflected on the surface contacting the ridge 194 of the fingerprint 190 in the cover layer 180.

In the case of the fingerprint recognition sensor 100 according to the exemplary embodiments, the angle formed by the first surface 122a and the third surface 122c may be approximately 19° or lower in the protrusion 122 of the light direction switching layer 120. As a result, the light $L_{91}$ may be total-reflected on the surface corresponding to the valley 192 of the fingerprint 190 in the cover layer 180 and a difference from the light $L_{92}$ partially reflected in the fingerprint image may be clearly exposed. Further, even though the cover layer 180 is relatively thicker than the sensor pixel 160, the clear fingerprint image may be generated.

In the case of the exemplary embodiment of FIG. 9B, the fingerprint recognition sensor 100 may include two light direction switching layers 220 and 230 and the angle formed by the first surface 222a and the third surface 222c of the first protrusion and the angle formed by the fourth surface 232a and the sixth surface 232c of the second protrusion may not be limited to approximately 19° or lower.

The general fingerprint recognition sensor may include a separate lens and a separate detector in order to detect the light reflected on the fingerprint and the transistor driving the fingerprint recognition sensor is externally separately provided, and as a result, the total thickness of the sensor may increase and the volume of the sensor cannot but increase. Further, the general fingerprint recognition sensor may not be easily coupled with another device such as a display panel.

On the contrary, the fingerprint recognition sensor 100 according to the exemplary embodiments does not include the separate lens and the separate detector and includes the thin film transistor TFT in the sensor 100 to reduce the volume of the sensor 100. Further, the fingerprint recognition sensor 100 may be easily coupled with another device such as the display panel.

Figure 11A:
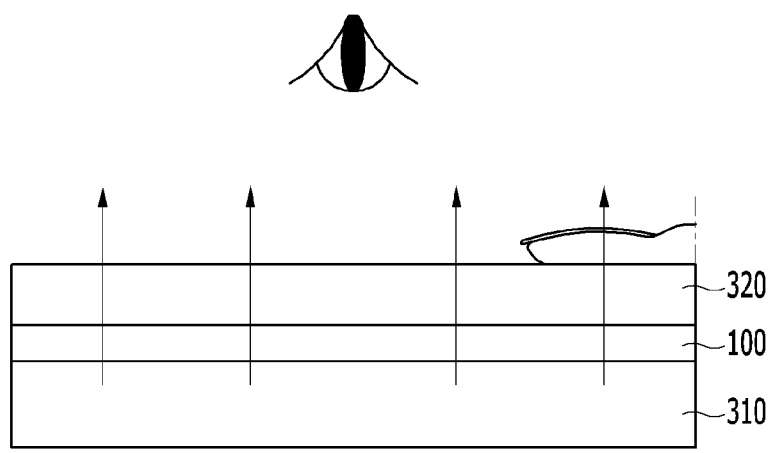
FIG. 11A is a schematic view of a mobile display device according to an exemplary embodiment and FIG. 11B is a schematic view of a mobile display device according to an exemplary embodiment.
Figure 11B:
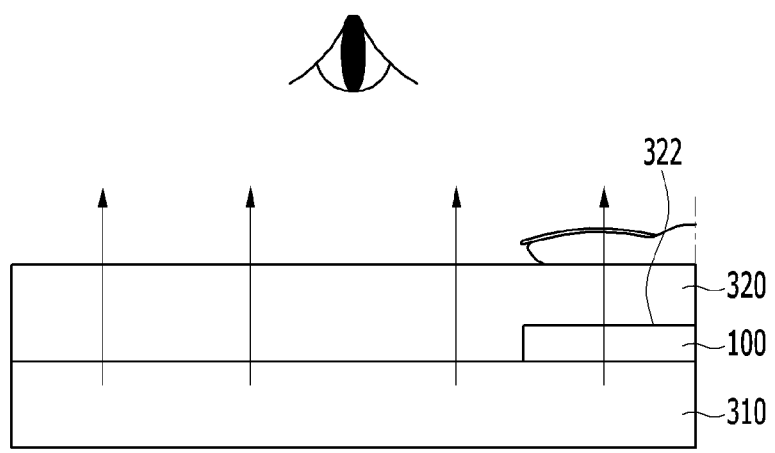

FIG. 11A is a schematic view of a mobile display device according to an exemplary embodiment and FIG. 11B is a schematic view of a mobile display device according to an exemplary embodiment.

Referring to FIGS. 11A and 11B, the mobile display device 300 according to the exemplary embodiment includes a display panel 310 displaying an image or video, a transparent protective layer 320 positioned on the display panel 310, and the fingerprint recognition sensor 100 positioned at least at a partial area between the display panel 300 and the transparent protective layer 320.

Herein, the fingerprint recognition sensor 100 may be positioned to correspond to the entire surface of the transparent protective layer 320 and positioned at a groove 322 formed at a partial area of the transparent protective layer 320.

The fingerprint recognition sensor 100 may include the light source 110, but may not include the light source 110. When the fingerprint recognition sensor 100 does not include the separate light source 110, the fingerprint recognition sensor 100 may recognize the fingerprint by using the light generated when the display panel 310 operates.

The general fingerprint recognition sensor 100 includes the cover glass and when another display panel is used as the light source, distinguishing the brightness is uncertain due to the diffused reflection at the valley of the fingerprint, and as a result, the definition of the fingerprint image may be low or it may be difficult to acquire the fingerprint image itself. Therefore, it may not be easy to allow the display device to recognize the fingerprint.

On the contrary, since the mobile display device 300 according to the exemplary embodiment may produce the clear fingerprint image by using the total reflection in spite of using the light of the display panel 310, the fingerprint recognition may be easier.

The display panel 310 may be, for example, a liquid crystal display panel or an organic light emitting display panel, but is not limited thereto.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A fingerprint recognition sensor comprising:
a light source positioned while being spaced apart on one surface of the substrate and irradiating light toward the substrate;
a light direction switching layer positioned between the substrate and the light source, having a thickness-direction cross-section having a right-angled triangular shape, and including multiple protrusions constituted by a first surface in which the light irradiated from the light source is incident and refracted, a second surface contacting the one surface of the substrate, in which the refracted light is transmitted toward the substrate, and a third surface vertical to the one surface of the substrate;
a cover layer spaced apart from the other surface of the substrate and facing the substrate;
multiple sensor pixels defined by multiple scan lines and multiple data readout lines on the other surface of the substrate and positioned between the substrate and the cover layer; and
multiple photo sensors positioned in the respective sensor pixels and sensing the light transmitted from the light direction switching layer toward the substrate and total-reflected on a surface contacting a fingerprint of a user on the cover layer,
wherein an angle formed by the first surface and the third surface of the protrusion is 19° or lower.

2. The fingerprint recognition sensor of claim 1, wherein:
as the angle formed by the first surface and the third surface of the protrusion is smaller, an incident angle of the light transmitted toward the substrate on the surface contacting the fingerprint of the user in the cover layer increases.

3. The fingerprint recognition sensor of claim 1, wherein: the angle formed by the first surface and the third surface of the respective protrusion is different from each other.

4. The fingerprint recognition sensor of claim 3, wherein: a thickness-direction length of the third surface of the respective protrusion is different from each other.

5. The fingerprint recognition sensor of claim 1, wherein: a refractive index of the respective protrusion is larger than 1.0 and equal to or less than 2.0, and the refractive index of the respective protrusion is the same as each other.

6. The fingerprint recognition sensor of claim 5, wherein: the refractive index of the cover layer is larger than 1.0 and equal to or less than 2.0, and the refractive index of the cover layer is the same as the refractive index of the protrusion.

7. The fingerprint recognition sensor of claim 1, further comprising:
multiple thin film transistors connected to the multiple scan lines and the multiple data readout lines and transmitting a current signal depending on resistance variation of each photo sensor to the multiple data readout lines,
wherein each photo sensor includes a first electrode formed by extending the drain electrode of the thin film transistor, a semiconductor layer positioned on the first electrode, and a second electrode including the transparent material and positioned on the semiconductor layer, and
wherein the first electrode and the second electrode form a capacitor.

8. The fingerprint recognition sensor of claim 7, wherein: the thin film transistor has a co-planar structure, a staggered structure, an inverted co-planar structure, or an inverted staggered structure.

9. The fingerprint recognition sensor of claim 7, wherein: a channel layer of the thin film transistor includes a low-temperature polycrystalline silicon (LTPS), an amorphous silicon (a-Si), or an oxide.

10. The fingerprint recognition sensor of claim 7, wherein:
a semiconductor layer of the photo sensor includes an amorphous silicon (a-Si), an organic material, or a quantum dot.

11. A fingerprint recognition sensor comprising:
a light source positioned while being spaced apart on one surface of the substrate and irradiating light toward the substrate;
a first light direction switching layer positioned between the substrate and the light source, having a thickness-direction cross-section having a right-angled triangular shape, and including multiple first protrusions constituted by a first surface in which the light irradiated from the light source is incident and refracted, a second surface parallel to the one surface of the substrate, in which the refracted light is transmitted, and a third surface vertical to the one surface of the substrate;
a second light direction switching layer positioned between the first light direction switching layer and the substrate and having a thickness-direction cross-section having a right-angled triangular shape, and including multiple second protrusions constituted by a fourth surface in which the light transmitted from the first light direction switching layer is incident and refracted, a fifth surface contacting the one surface of the substrate, in which the refracted light is transmitted toward the substrate, and a sixth surface vertical to the one surface of the substrate;
a cover layer spaced apart from the other surface of the substrate and facing the substrate;
multiple sensor pixels defined by multiple scan lines and multiple data readout lines on the other surface of the substrate and positioned between the substrate and the cover layer; and
multiple photo sensors positioned in the respective sensor pixels and sensing the light transmitted from the second light direction switching layer toward the substrate and total-reflected on a surface contacting a fingerprint of a user on the cover layer.

12. The fingerprint recognition sensor of claim 11, wherein:
the angle formed by the first surface and the third surface of the respective first protrusion is different from each other, and
a thickness-direction length of the third surface of the respective first protrusion is the same as each other.

13. The fingerprint recognition sensor of claim 12, wherein:
the respective first protrusion and the respective second protrusion overlap with each other in the thickness direction, and
the angle formed by the first surface and the third surface of the respective first protrusion is the same as the angle formed by the fourth surface and the sixth surface of the respective second protrusion which overlaps with the respective first protrusion.

14. The fingerprint recognition sensor of claim 11, wherein:
a refractive index of the first protrusion is different from a refractive index of the second protrusion.

15. The fingerprint recognition sensor of claim 11, further comprising:
multiple thin film transistors connected to the multiple scan lines and the multiple data readout lines and transmitting a current signal depending on resistance variation of each photo sensor to the multiple data readout lines.

16. A mobile display device comprising:
a display panel displaying an image or video;
a transparent protective layer positioned on the display panel; and
a fingerprint recognition sensor of claim 1, which is positioned at least at a partial area between the display panel and the transparent protective layer.

17. The mobile display device of claim 16, wherein:
the fingerprint recognition sensor is positioned at a groove positioned in a partial area of the transparent protective layer.

* * * * *